United States Patent
Sbisa

(10) Patent No.: US 7,224,965 B1
(45) Date of Patent: May 29, 2007

(54) TELECOMMUNICATIONS SERVICE CONTROL POINT WITH DIGIT COLLECTION LOGIC

(75) Inventor: Daniel Charles Sbisa, Blue Springs, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 661 days.

(21) Appl. No.: 10/405,422

(22) Filed: Apr. 2, 2003

Related U.S. Application Data

(63) Continuation of application No. 09/346,758, filed on Jul. 1, 1999, now Pat. No. 6,567,659.

(51) Int. Cl.
*H04M 3/42* (2006.01)

(52) U.S. Cl. .................. 455/415; 455/414.1; 455/428; 379/221.9; 379/221.12; 379/221.14

(58) Field of Classification Search ................ 455/415, 455/424, 428, 445, 560, 191.3, 414.1; 379/88.23, 379/88.2, 210.03, 266.01, 221.9, 221.12, 379/221.14; 370/351, 356
See application file for complete search history.

(56) References Cited

U.S. PATENT DOCUMENTS

| | | | |
|---|---|---|---|
| 5,416,830 A * | 5/1995 | MacMillan et al. | 379/88.01 |
| 5,444,774 A * | 8/1995 | Friedes | 379/266.01 |
| 5,694,463 A | 12/1997 | Christie et al. | |
| 5,793,853 A | 8/1998 | Sbisa | |
| 5,845,211 A | 12/1998 | Roach, Jr. | |
| 5,923,744 A | 7/1999 | Cheng | |
| 5,933,486 A | 8/1999 | Norby et al. | |
| 6,044,259 A | 3/2000 | Hentila et al. | |
| 6,097,803 A | 8/2000 | Sbisa | |
| 6,115,600 A | 9/2000 | Tuohino et al. | |
| 6,188,751 B1 * | 2/2001 | Scherer | 379/88.22 |
| 6,275,695 B1 | 8/2001 | Obhan | |
| 6,332,022 B1 * | 12/2001 | Martinez | 379/220.01 |
| 6,424,702 B1 | 7/2002 | Blumenschein et al. | |
| 6,463,136 B1 * | 10/2002 | Malik | 379/111 |
| 6,470,081 B1 | 10/2002 | Sbisa et al. | |
| 6,529,504 B1 | 3/2003 | Sbisa | |
| 6,567,659 B1 | 5/2003 | Sbisa | |
| 6,603,851 B1 | 8/2003 | Smith et al. | |

OTHER PUBLICATIONS

Briere, Daniel, "Sprint Plans Sweeping' Network Revisions," Network World, Inc., Sep. 20, 1993.
U.S. Appl. No. 09/276,290, filed Dec. 7, 1995.
US. Appl. No. 09/345,936, filed Jul. 1, 1999.
U.S. Appl. No. 09/368,812, filed Aug. 5, 1999.
U.S. Appl. No. 09/368,811, filed Aug. 5, 1999.

\* cited by examiner

*Primary Examiner*—Congvan Tran

(57) ABSTRACT

A service control point comprising a processing system coupled to an interface. The processing system is configured to process a first message to generate a second message containing instructions to a communication device to collect digits from a caller, and process a third message with the collected digits to generate a fourth message with call handling information for a call. The interface is configured to receive the first message from the communication device, transmit the second message for the communication device, receive the third message from the communication device and transmit the fourth message for the communication device.

26 Claims, 14 Drawing Sheets

TELECOMMUNICATIONS SERVICE CONTROL POINT WITH DIGIT COLLECTION LOGIC

RELATED APPLICATIONS

This application is a continuation of U.S. patent application Ser. No. 09/346,758, filed Jul. 1, 1999 now U.S. Pat. No. 6,567,659, entitled Telecommunications Service Control Point with Digit Collection Logic, and that is hereby incorporated by reference into this application.

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to a telecommunications service control point (SCP), and specifically, to an SCP having digit collection logic. More specifically, to an SCP having a processing system and interface configured to instruct communications devices within a telecommunications network to collect digits for call processing and validation.

2. Description of the Prior Art

In a telecommunications network, an SCP provides service information to devices in the network using call processing applications within the SCP. Some examples of service information provided by the SCP include special service number routing information and calling card information. For instance, a switch receives a call requiring a special service to complete the call to a called destination. Recognizing the need for a service, the switch transmits a query message to the SCP. The SCP processes the query message and returns a response message containing service information for the call. These query and response messages are generally Signaling System #7 (SS7) Transaction Capabilities Application Part (TCAP) protocol messages that are well known in the art.

In some cases, the collection of digits from a caller is required before the SCP can provide services for the call. For example, a toll free number may include an associated personal identification number (PIN). When a call is placed to the toll free number, the associated PIN number must be collected to process the call. Presently, the digit collection control logic for these types of services is decentralized within the telecommunications network. In some cases, the control logic is located in a switch, while in other cases the control logic is located in a telecommunication resource sometimes referred to as a service platform.

In one example of digit collection in a resource, a telecommunications switch may receive a pre-paid calling card call requiring the collection of the calling card number to process the call. The switch, recognizing the need for a resource, transmits a query message to the SCP. The SCP, recognizing the need for digit collection, processes the query message and generates a response message that routes the call to a resource. The resource processes the call by playing prompts, collecting digits from the caller, validating the collected digits and sending a transfer request message to the SCP. The SCP processes the transfer request message, disconnects the resource, and sends a response message to the switch that routes the call to the final destination.

In another example of digit collection, a switch receives a toll free call requiring the collection of a PIN to process the call. Recognizing the need for digit collection, the switch processes the call by collecting the digits from the caller. Depending on its programming the switch may either validate the collected digits internally or send a query message to the SCP for validation of the collected digits by the SCP.

Unfortunately, the addition of services requiring digit collection is a problem in the art of telecommunications because of the decentralized digit collection control logic. Where a service requiring digit collection is added, the SCP as well as all switches and resources with digit collection logic must be reprogrammed for the new service. Thus it is desirable in the art of telecommunications to centralize digit control logic in the SCP.

SUMMARY OF THE INVENTION

The present invention advances the art by providing an SCP configured to instruct communications devices within a network to collect digits from a caller. The SCP is further configured to validate and process the collected digits to generate call handling information for calls. Advantageously, the digit collection control logic is centralized within the SCP. In addition, the digit collection control logic is interfaced with other call processing applications allowing for the construction and homogeneous integration of entire services in an SCP.

The present SCP comprises a processing system and an interface coupled to the processing system. The processing system is configured to process a first message to generate a second message containing instructions for a communication device to collect digits from a caller. The processing system is further configured to process a third message with the collected digits to generate a fourth message with call handling information for a call. The interface is configured to receive the first message from the communication device, transmit the second message with the digit collection instructions for the communication device, receive the third message with the collected digits from the communication device, and transmit the fourth message with the call handling information for the communication device.

DETAILED DESCRIPTION OF THE PREFERRED EMBODIMENT

Figure 1:
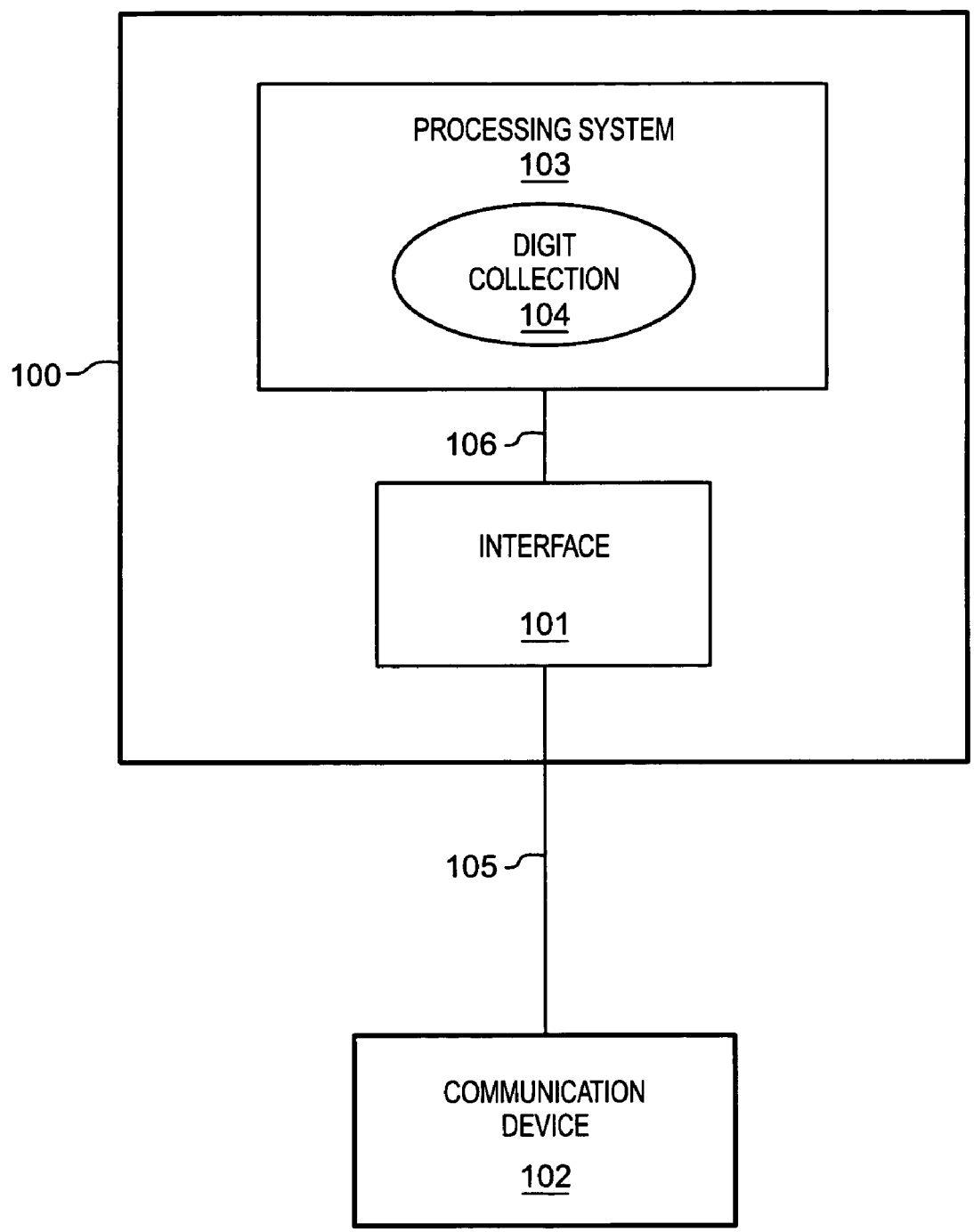
FIG. 1 illustrates a system architecture in an example of the present invention.

FIG. 1 depicts SCP 100 and communication device 102. SCP 100 comprises processing system 103 and interface 101. Processing system 103 comprises digit collection call processing application 104. One skilled in the art will appreciate that processing system 103 would include other call processing applications although only digit collection call processing application 104 is shown for clarity. Communication device 102 is connected to interface 101 by link 105. Link 105 could be any link capable of exchanging messages between interface 101 and communication device 102. Interface 101 is connected to processing system 103 by link 106. Link 106 could be any link capable of exchanging messages between interface 101 and processing system 103.

Processing system 103 could be any processing system capable of: 1) processing a first message to generate a second message containing instructions for communication device 102 to collect digits from a caller, and 2) processing a third message with the collected digits to generate a fourth message with call handling information for a call. It should be noted that in the context of this application, the first, second, third, fourth, etc. connotations used to reference the messages are used solely for the purpose of differentiating between different messages and are not used to indicate a message sequence or processing sequence.

Interface 101 could be any interface capable of: 1) receiving the first message from communication device 102, 2) transmitting the second message with the digit collection instructions for communication device 102, 3) receiving the third message with the collected digits from communication device 102, and 4) transmitting the fourth message with the call handling information for communication device 102.

Figure 2:
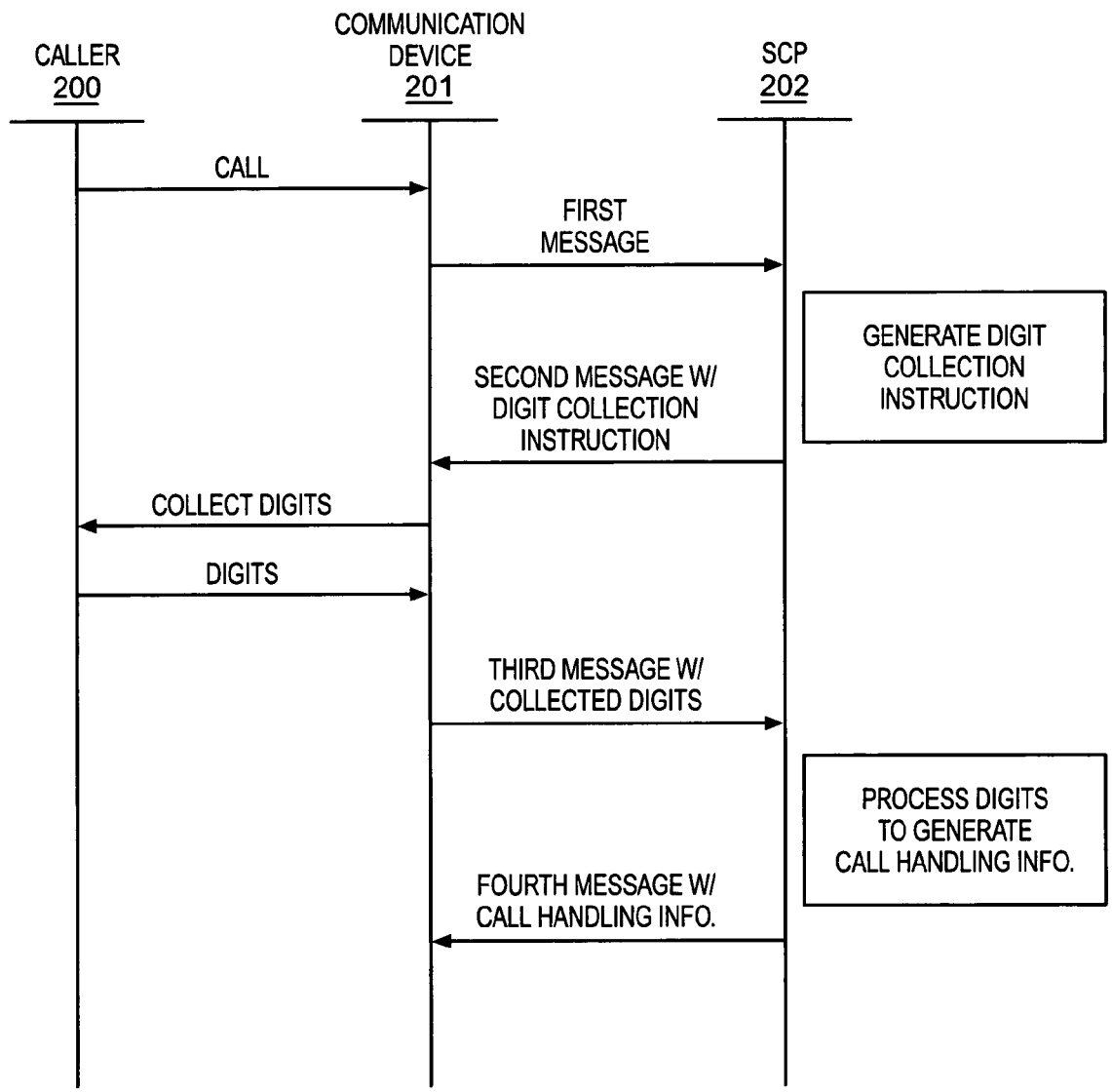
FIG. 2 illustrates a message sequence diagram for a digit collection operation in an example of the invention.

FIG. 2 depicts a message sequence chart for an SCP 202 in an example of the present invention. In FIG. 2 the caller 200 places a call. The call is received by communication device 201, which generates a first message for SCP 202 to obtain call handling information. Recognizing the need for digit collection, SCP 202 processes the first message to generate a second message containing instructions for communication device 201 to collect digits from caller 200. Communication device 201 collects the digits from caller 200 and generates a third message with the collected digits for SCP 202. SCP 202 process the third message with the collected digits to generate a fourth message for communication device 201 with the call handling information for the call.

Figure 3:
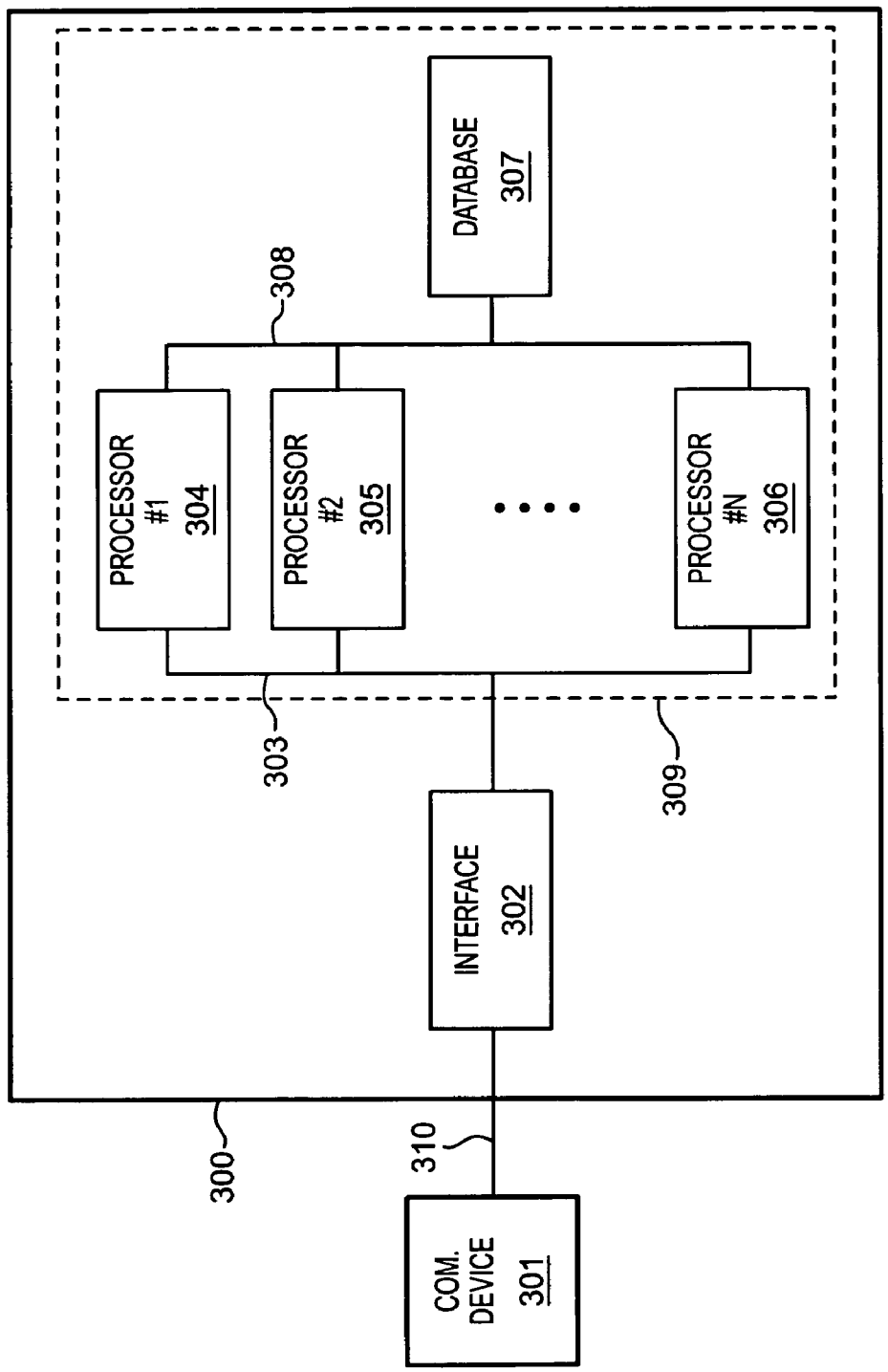
FIG. 3 illustrates an SCP architecture in an example of the present invention.

SCP Architecture and Operation:

FIG. 3 depicts an SCP architecture and communication device in an example of the present invention, but those skilled in the art will recognize numerous other configurations that are applicable to the invention described above. Those skilled in the art will also appreciate how combinations of features described below can be combined with the above-described embodiment.

FIG. 3 depicts SCP 300 and communication device 301. SCP 300 comprises processing system 309, links 303 and 308, and interface 302. Processing system 309 comprises central processing units (CPUs) 304, 305 and 306 and database 307. As those skilled in the art are aware, a processing system can be comprised of a single CPU or can be distributed across multiple CPUs. Multiple CPUs are depicted on FIG. 1 although only CPUs 304, 305, and 306 are shown for clarity. Communication device 301 could be any communication device capable of conforming to the interface message rules for interacting with SCP 300. One example of a communications device 301 is a telecommunications switch.

Interface 302 is connected to CPUs 304, 305 and 306 by link 303. Database 307 is connected to CPUs 304, 305 and 306 by link 308. Communication device 301 is connected to interface 302 by link 310. Link 310 could be any link capable of exchanging messages between interface 302 and communication device 301. One example of link 310 could be a link having SS7 message transfer part functionality and SS7 signaling connection control part functionality that is known in the art. Although they are not shown for clarity, interface 302 could handle numerous such links to other elements in a telecommunications network.

Processing system 309 could be any processing system where one of CPUs 304, 305 or 306 is capable of: 1) processing a first message to generate a second message containing instructions to communication device 301 to collect digits from a caller, and 2) process a third message with the collected digits to generate a fourth message with call handling information for a call. An example of the first, second, third and fourth messages include SS7 TCAP protocol messages, wherein the second message and the third message are conversational TCAP messages.

The call handling information is typically routing information to one or more switches in the network and connection to a call destination. Alternatively, call handling information can include other instructions, such as call termination instructions or routing information. CPUs 304, 305 and 306 access database 307 to support call processing. An example of processing system 309 including CPUs 304, 305 and 306, link 308, and database 307 is the Tandem Himalaya loaded with the Tandem Guardian operating system, in addition to database management software and various conventional utilities. Link 303 could be any link for interfacing processors and exchanging messages between interface 302 and processors 304, 305 and 306. Link 308 could be any link for interfacing processors and exchanging messages between database 307 and processors 304, 305 and 306.

Interface 302 could be any interface capable of receiving the first message from communication device 301, transmitting the second message with the digit collection instructions for communication device 301, receiving the third message with the collected digits from communication device 301, and transmitting the fourth message with the call handling information for communication device 301. An example of interface 302 could be an interface configured to receive multiple messages in multiple protocols and provide access to the multiple processors within SCP 300.

Figure 4:
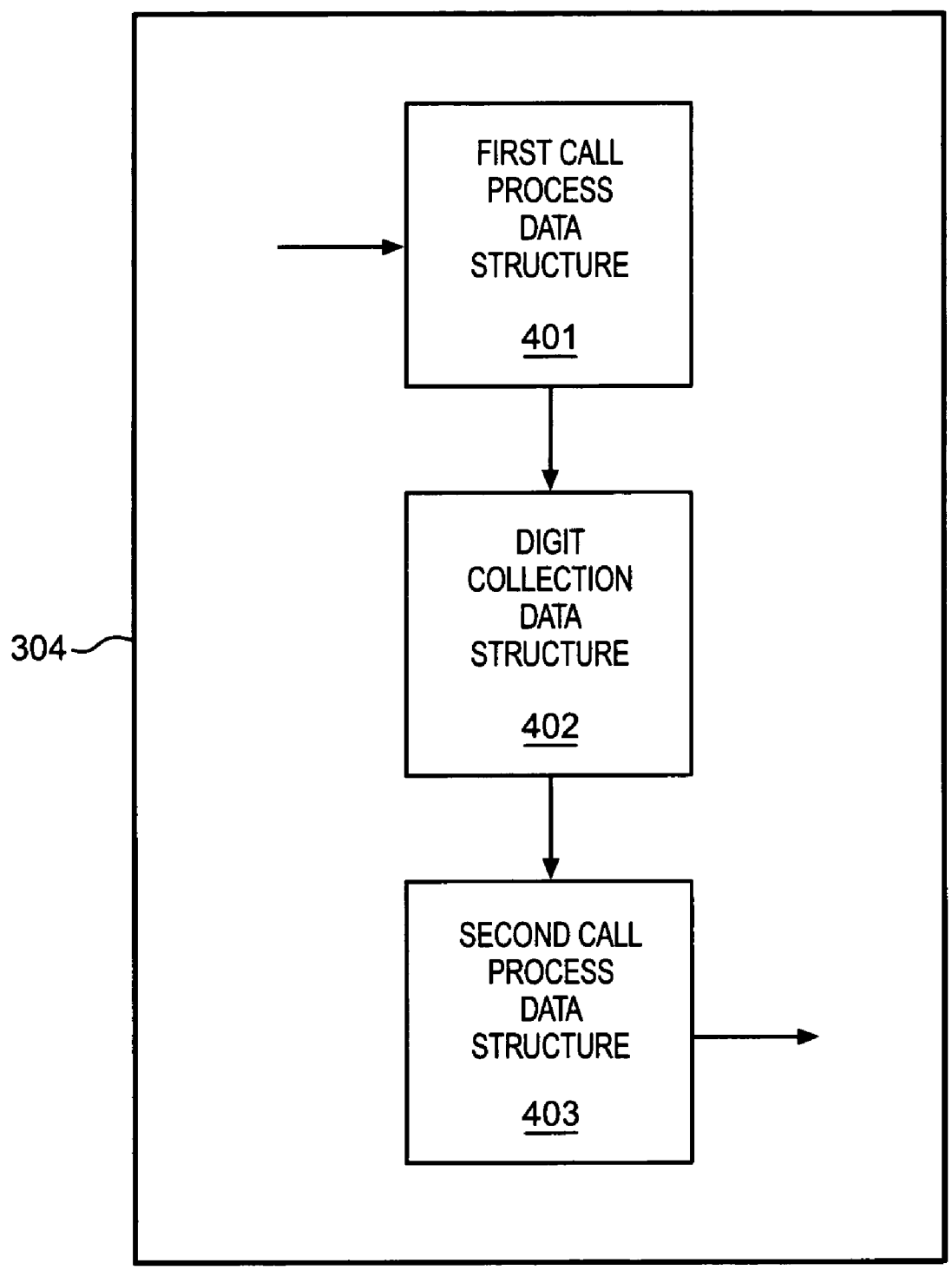
FIG. 4 illustrates a call processing architecture in an example of the present invention.

FIG. 4 depicts the operation of the processing logic in CPU 304 of SCP 300 in some embodiments of the invention.

The processing logic in other CPUs would be similar. Those skilled in the art will appreciate that numerous other configurations of the processing logic can be derived from the following example that are within the scope of the invention. Those skilled in the art will also appreciate how the principles illustrated in this example can be used in other examples of the invention.

CPU 304 processes messages using data structures. A data structure is a table that can be entered with information or pointers. CPU 304 processes the data structure until the data structure yields either the desired information or a pointer to another data structure. For example, CPU 304 could enter first call processing application 401 to obtain a first pointer to digit collection data structure 402. Digit collection data structure 402 is used to collect digits from a caller and to match or validate the collected digits against defined digits within digit collection data structure 402. Digit collection data structure 402 could also yield a second pointer to second call processing application 403.

Figure 5:
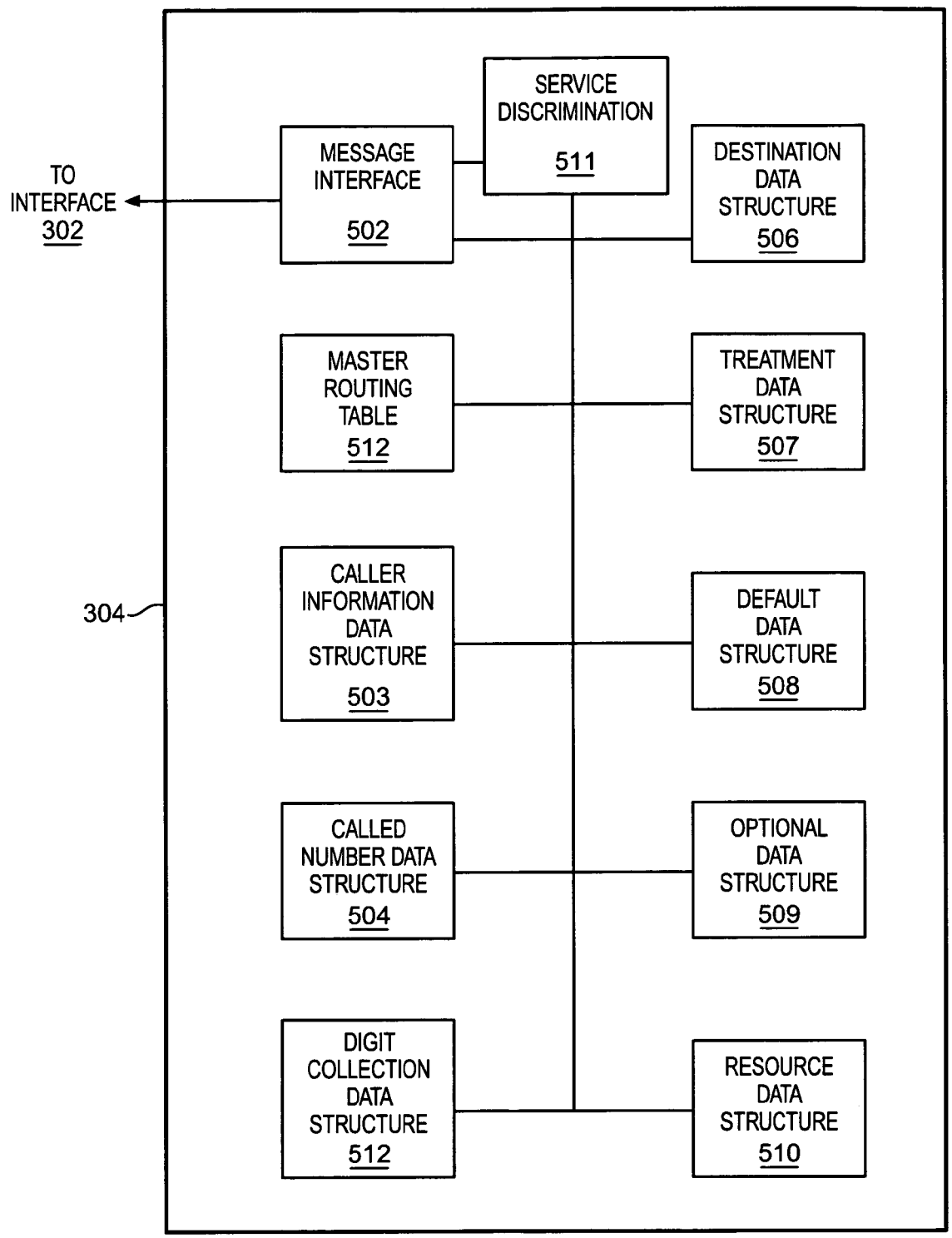
FIG. 5 illustrates a call processing operation in an example of the present invention.
Figure 6:
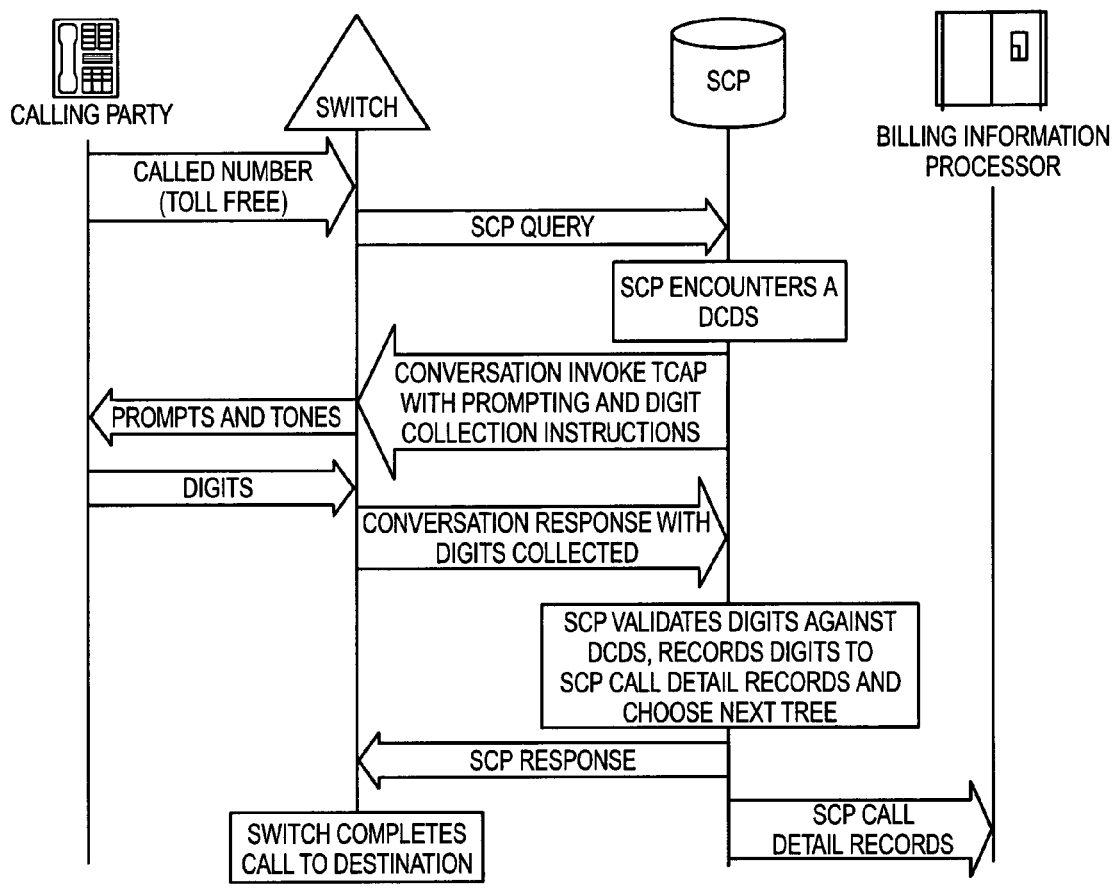
FIG. 6 illustrates a message sequence diagram for a digit collection operation in an example of the present invention.

FIG. 5 depicts additional details of processing logic in CPU 304. CPU 304 uses message interface 502 to exchange messages with interface 302. CPU 304 performs a service discrimination process 511 on the call whereby a trigger index in the message is checked to yield a pointer to a next tree data structure. This pointer is referred to as a tree ID and the segment of the data structure is referred to as a tree. The service discrimination process 511 points to a master routing table 512, a treatment data structure 507, a resource data structure 510, or a default data structure 508. The master routing table 512 provides the initial tree ID for a decision data structure, the resource data structure 510, the treatment data structure 507, or default data structure 508. The decision data structures include a caller information data structure 503, a called number data structure 504, a digit collection data structure 512, and an optional decision data structure 509.

The caller information data structure 503 is entered with the caller information from the first message. The caller information data structure 503 can be used to partition callers into logical groupings. For example, callers who subscribe to a particular service provider could be grouped together in the caller information data structure 503. The caller information data structure 503 can partition callers by their telephone number, by a circuit used to place the call, by the method of carrier selection, or by a type of device used to place the call. In addition, callers who are not desired can be pointed to the treatment data structure 507 to reject the call attempt. The caller information data structure 503 also yields a pointer to the called number data structure 504, destination data structure 506, the default data structure 508 or digit collection data structure 512.

The called number data structure 504 is entered by using a pointer to the called number. The called number data structure 504 yields a pointer to the digit collection data structure 512, the treatment data structure 507, the default data structure 508, the optional decision data structure 509, the resource data structure 510, or destination data structure 506.

The digit collection data structure 512 collects digits from a caller and matches or validates the collected digits against defined digits within the digit collection data structure 512. The digit collection data structure 512 can yield a pointer to one of the other data structures for additional call processing or generate a response message for message interface 502. For example, the digit collection data structure 512 could yield a pointer to the destination data structure 506, the treatment data structure 507, the default data structure 508, the optional decision data structure 509, the resource data structure 510, or called number data structure 504. Those skilled in the art will appreciate that one of the other data structures could also be another digit collection data structure (not shown), but functionally equivalent to digit collection data structure 512.

Operationally, digit collection data structure 512 processes the first message to generate instructions for communication device 301 to collect digits from the caller and produces the second message with this information for the message interface 502. In addition, the digit collection data structure 512 processes the third message from communication device 301 with the collected digits and yields a pointer to another data structure for the generation of call handling information.

Digit collection data structure 512 could point to destination data structure 506 for the generation of call handling information. Destination data structure 506 yields a selected switch and connection for the call, and produces an SCP response message with this call routing information for the message interface 502. Digit collection data structure 512 could also point to treatment data structure 507 for the generation of call handling information. Treatment data structure 507 is used to reject calls or apply any treatment for the given call profile. Treatment data structure 507 produces an SCP response message for message interface 502. Digit collection data structure 512 could also point to default data structure 508 for the generation of call handling information. Default data structure 508 is used to provide default connections or handle mistakes in the data structures. For example, calls could be routed to an operator using default data structure 508. Default data structure 508 produces an SCP response message for the message interface 502.

Digit collection data structure 512 could also point to optional decision data structure 509 for the generation of call handling information. Optional decision data structure 509 is used to apply additional logic to the call as would be appreciated by those skilled in the art. Some examples of such additional logic are data structures for processing the call based on a time of day, II digits, call distribution, or remote processor information. Optional decision data structure 509 points to destination data structure 506, treatment data structure 507, default data structure 508 or resource data structure 510.

Digit collection data structure 512 could also point to resource data structure 510 for the generation of call handling information. Resource data structure 510 typically yields routing information that indicates the switch and trunk that are connected to the desired resource or destination. The resource data structure 510 generates a response message with a call ID and the routing information for transfer by the message interface 502. Resource data structure 510 can be accessed by any other data structure. The message interface 502 can enter a caller information data structure 503 using information in a transfer message and yield a pointer to the resource data structure 510. Resource data structure 510 is also accessed by the called number data structure 504 if the called number determines the need for a resource. The treatment data structure 507 can point to the resource data structure 510 where the treatment determines the need for a resource. In a similar fashion, the optional decision data structure 509 could point to the resource data structure 510 based on its processing. The resource data structure 510 could point to the treatment data structure 507 or the default data structure 508.

Digit Collection:

FIGS. 6–14 illustrate an example of digit collection in an example of the present invention, but those skilled in the art will recognize numerous other configurations that are applicable to the invention described above. Those skilled in the art will also appreciate how combinations of features described below can be combined with the above-described embodiment.

The digit collection data structure (DCDS) extends the capabilities of the SCP by allowing a customer tree to define a data structure that interacts with a switch to collect digits. The digits collected are used to make routing decisions for call completion.

In one example of a call scenario, a query is sent from the switch to the SCP using the existing SCP trigger capabilities. The SCP performs the same service discrimination functions currently supported by SCP technology. For example, the SCP checks the trigger index to determine the tree ID of the call to access the appropriate data structure. If the SCP encounters a digit collection data structure, SCP call processing would use the information elements of the DCDS to enter conversation messaging with the switch. The DCDS information elements include but are not limited to, the dial plan, digit length, prompt and timers. Once the SCP has collected the required digits from the switch the DCDS validates the digits and selects the next tree data structure operation associated with the digits collected. If the digits cannot be validated the DCDS treatment condition is used to complete the call.

Figure 7:
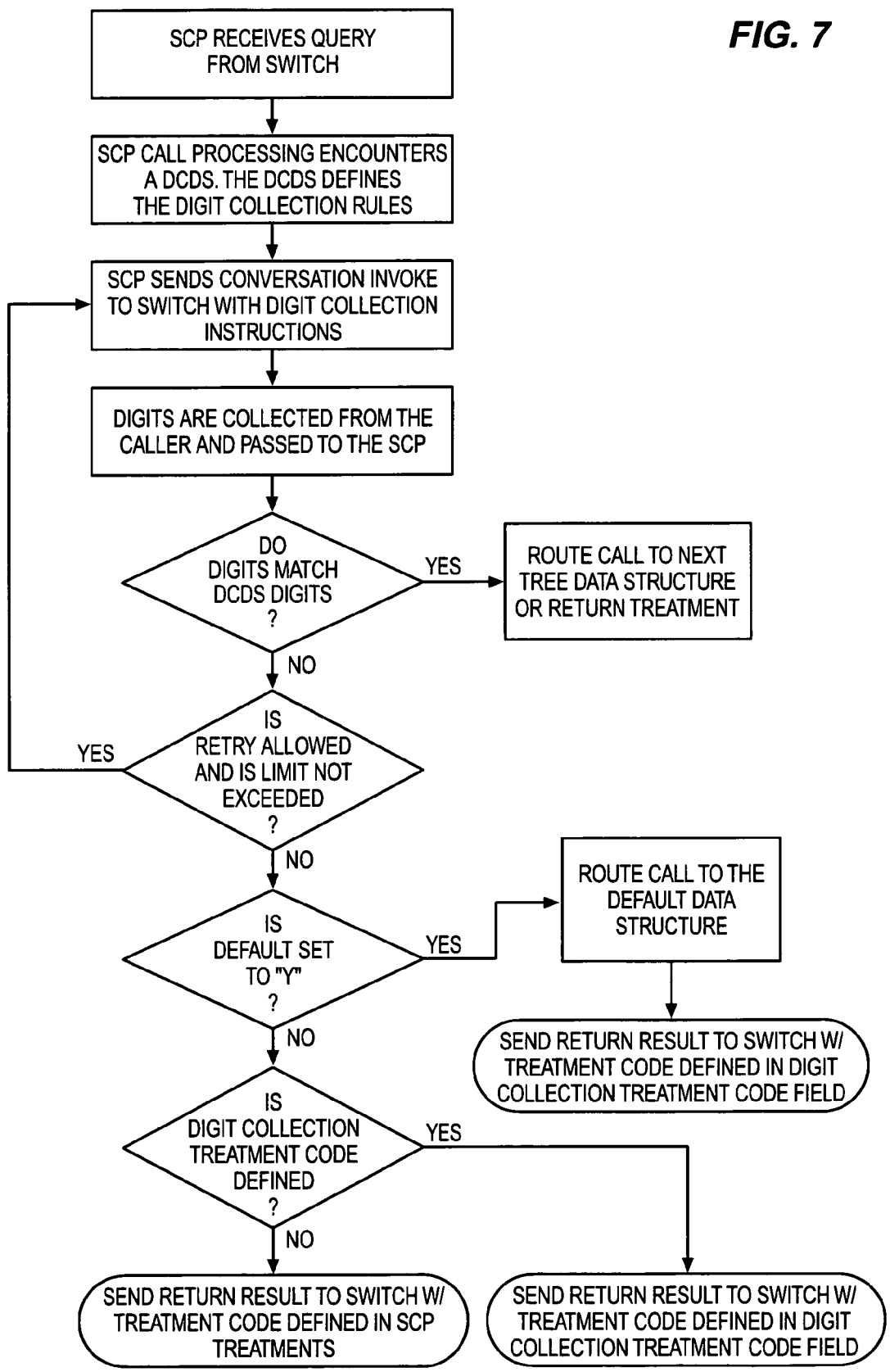
FIG. 7 illustrates a flow diagram of a digit collection operation in an example of the present invention.

The next tree operation of the DCDS may include any of the existing SCP decision data structures or an SCP routing data structure such as the resource data structure. The DCDS treatment condition is a new treatment added to the treatment data structure. The treatment is associated with call processing when the SCP is unable to validate the digits collected through conversation messaging against the DCDS digits and the DCDS does not have a defined Digit Collection Treatment Code. FIG. 7 illustrates a process flow of the DCDS operation.

Functional Description:

The SCP Routing Plans are modified to include the DCDS. The DCDS defines the digit collection rules a call must meet in order to complete to the desired destination. The DCDS defines the digit type, length, prompt, inter-digit timer, uninterruptible condition, retry option, retry prompt and digit collection treatment code for the digit collection rules. The DCDS also defines against the collected digits, the feature code and next tree data structure or default treatment for the digit routing rules.

When a DCDS is encountered during SCP processing the SCP engages in conversation messaging with the switch. The conversation messaging is used to collect digits from the caller. The digit information collected by the switch is passed to the SCP in a conversation response message. The SCP uses the DCDS engaging the conversation messaging to determine how to use the digits collected. Meaning, the DCDS may use the digits collected to select a next tree data structure to route the call or select a next tree data structure to block the call. The SCP uses the DCDS to determine how digits should be collected. Once the SCP collects the digits the SCP uses the DCDS again to determine how to route the digits collected. The routing functions of the DCDS are similar to the routing functions of the master routing table. Namely, digits collected are matched against digits in the data structure. If a match exists a Tree ID and Initial data structure are selected based on status. If a match cannot be made treatment is applied.

The correlation between DCDS and the master routing table is important because the operational and maintenance functions associated to the DCDS mirror those of the master routing table. The DCDS is a data structure that enables SCP processing to reference a tree ID. The DCDS also has the ability to reference a tree ID based on the digits defined within the data structure.

Figure 8:
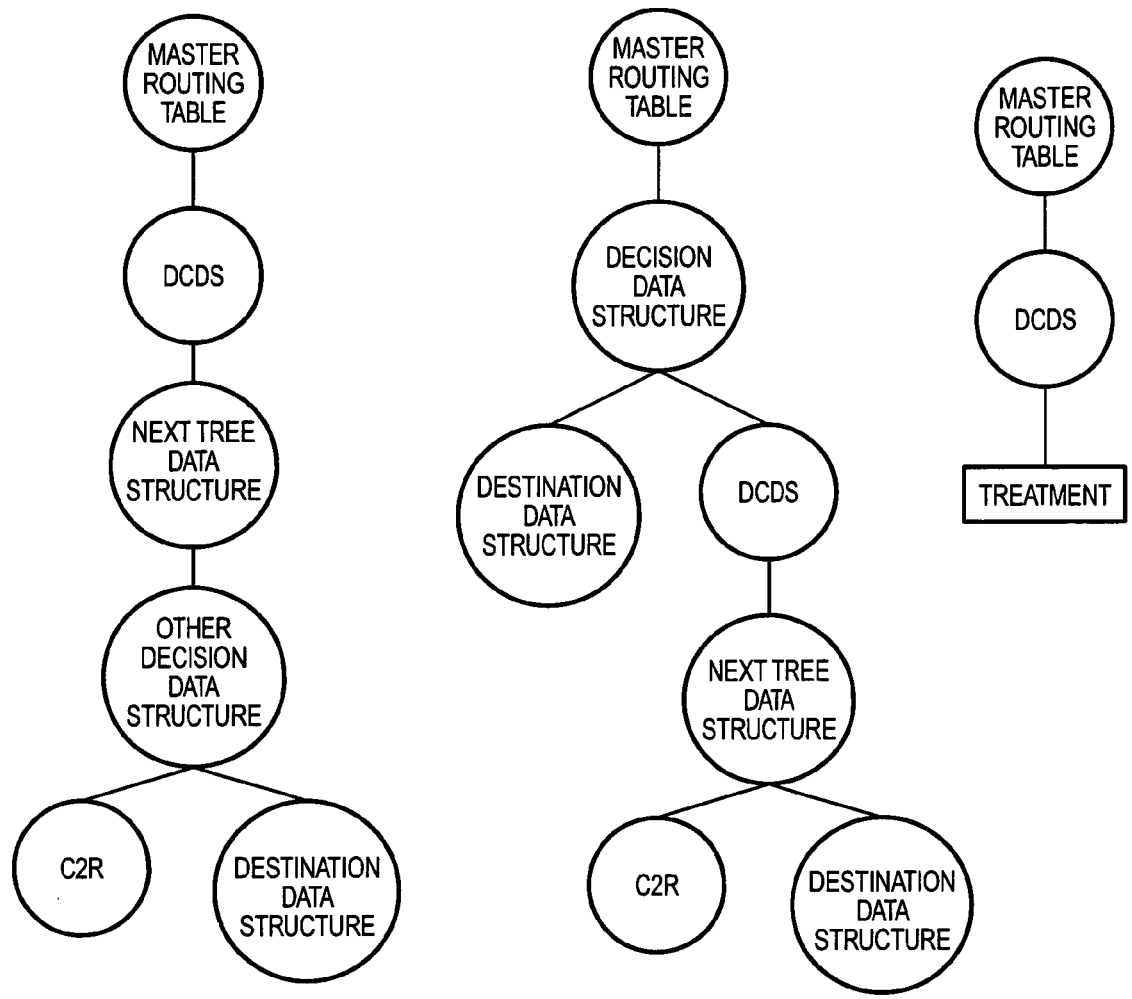
FIG. 8 illustrates examples of call processing architecture in an example of the present invention.

Feature Flow and Scenarios:

The DCDS is added to the list of SCP data structures and can be accessed by any decision data structure or be treated as the initial data structure. In addition, through the selection of a next tree the DCDS can select any other SCP data structure. The next tree may also determine that treatment should be applied. FIG. 8 illustrates the DCDS as the initial data structure, as a decision data structure and as a treatment.

DCDS Process:

DCDS is used by customers that require the collection of unique digits. The digits collected are used to perform an added function. For example, a set of unique digits may be collected for a call that can be used to determine the final destination of the call. The DCDS is structured to perform two key operations. Operation one is the collection of digits. The second operation matches digits against the digits associated to the DCDS and selects a next tree data structure.

In the digit collection operation the SCP interacts with the switch using conversation TCAP messaging to collect the required digits. The DCDS defines the digit collection conditions including the digit type, length, prompt, inter-digit timer, uninterruptible condition, append condition, retry option, retry prompt and digit collection treatment code. These conditions are associated to the message components of the conversation TCAP message exchanged between the SCP and switch.

Once the switch has completed the collection of the digits based on the SCP conversation message instructions, the switch sends the digits to the SCP in a conversation TCAP response message and the SCP executes the second DCDS operation.

The second DCDS operation matches the digits collected to the digits or range of digits defined within the DCDS and selects a next tree data structure. The SCP verifies that the digits collected meet the criteria for digit length specified in the DCDS. If the digits meet the length criteria the SCP continues processing. If the digits do not meet the length criteria, SCP processing checks the retry option. If the retry option is set to "Y" the SCP engages the switch in a subsequent conversation TCAP message to collect the digits again. The second conversation TCAP message passes the retry prompt value from the DCDS to the switch so the appropriate prompt is played. The switch collects the digits and forwards the digits to the SCP. The SCP verifies the digits collected from the second effort for length. If the digits meet the length criteria the SCP continues processing. If the digits do not meet the length criteria, SCP processing checks the retry option again and if the option is set to "Y" the SCP engages the switch in another conversation TCAP message to collect the digits. The switch collects the digits and forwards the digits to the SCP. The SCP verifies the digits collected. If the digits meet the length criteria the SCP continues processing. SCP DCDS call processing supports two (2) retry efforts when the retry option is set to "Y". If the second retry attempt fails SCP call processing references the Default condition. If the Default condition is set SCP call processing uses the next data structure information from the default selection. If Default is not set SCP call processing references the digit collection treatment code. If the digit collection treatment code has a value the SCP sends a return result message to the switch containing the treatment code. If the digit collection treatment code does not have a value SCP processing assigns a unique treatment code to the call and processes the call through the SCP Treatment table. The SCP Treatment table allows the definition of a treatment code that is returned to the switch in an SCP return result message.

After SCP processing determines the length of the digits collected by the switch meet the criteria of the DCDS, SCP processing attempts to match the digits against the range of digits or individual digit streams defined in the DCDS. For example, if the DCDS specified a digit length of eight (8) and the switch returned eight digits in the conversation response message, the DCDS checks the eight digits for a match. The DCDS can define individual digit streams or range of digits. A match is made to determine the next tree value for the call. If a match is not made, SCP processing checks the retry option. If the retry option is set to "Y" and the retry limit has not been exceeded the SCP engages the switch in a subsequent conversation TCAP message to collect the digits again. The second conversation TCAP message passes the retry prompt value from the DCDS to the switch so the appropriate prompt is played. The switch collects the digits and forwards the digits to the SCP. The SCP verifies the digits collected from the second effort for a match, assuming the length is correct. If a match is made the next tree value for the call is selected. If a match is not made SCP processing checks the retry option again. If the option is set to "Y" and the retry limit has not been exceeded, the SCP engages the switch in another conversation TCAP message to collect the digits. The switch collects the digits and forwards the digits to the SCP. The SCP verifies the digits collected. If a match is made against the digits collected the SCP continues processing. If a match is not made SCP processing checks the digit collection treatment code. SCP DCDS call processing supports two (2) retry efforts when the retry option is set to "Y". If the second retry attempt fails SCP call processing references the Default condition. If the Default condition is set SCP call processing uses the next data structure information from the default selection. If Default is not set SCP call processing references the digit collection treatment code. If the digit collection treatment code has a value the SCP sends a return result message to the switch containing the treatment code. If the digit collection treatment code does not have a value SCP processing assigns a unique treatment code to the call and processes the call through the SCP Treatment data structure. The SCP Treatment data structure allows the definition of a treatment code that is returned to the switch in an SCP return result message.

Each digit range entry of the DCDS has an associated next tree data structure. Once SCP processing has determined that the length is correct and an exact match on the digit range is made, the SCP uses the next tree data structure information to select the appropriate routing information. The from/to range of the DCDS can also reference a tree ID.

The option exists for a DCDS next tree to be accessed by other methods. For example, Tree ID 565656565 is accessed through the master routing table and through a DCDS. Trees used to route DCDS collected digits are not restricted to DCDS digit routing only.

Figure 9:
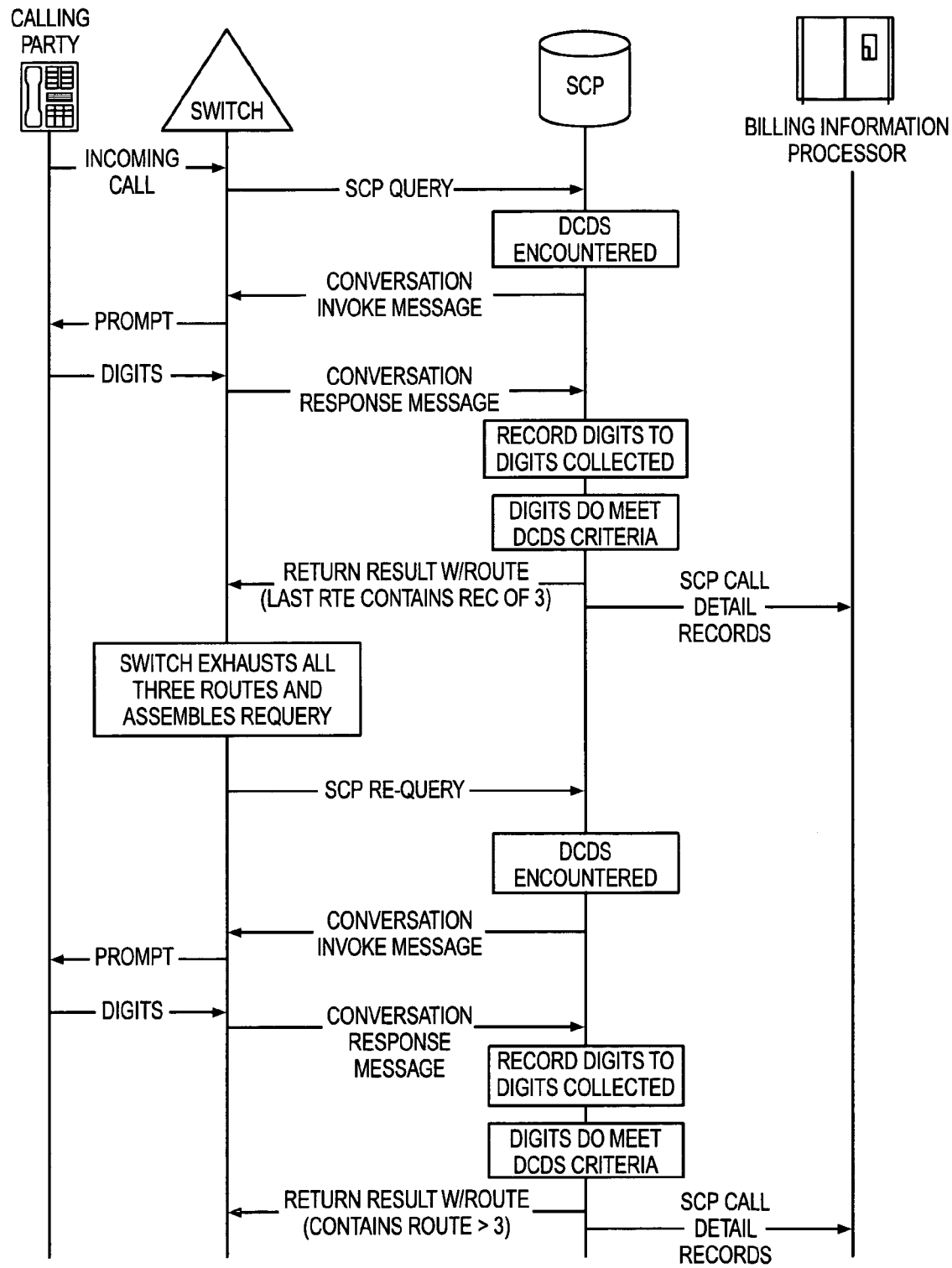
FIG. 9 illustrates a message sequence diagram for a call re-query to the SCP in an example of the present invention.
Figure 10:
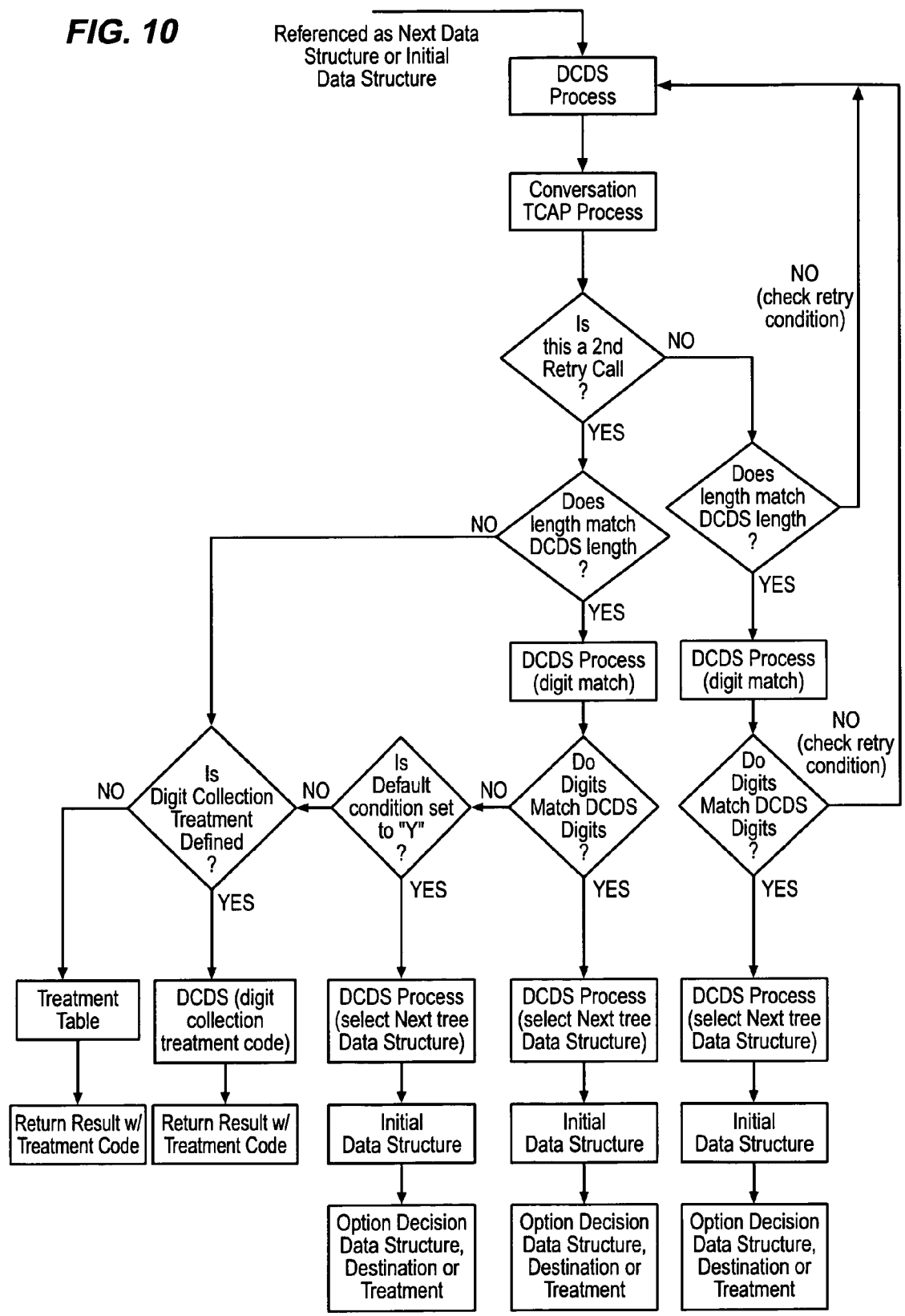
FIG. 10 illustrates a flow diagram for a call re-query to the SCP in an example of the present invention.

Re-Query:

The switch has the ability to Requery a call to the SCP based on exhaustion of attempted routes. The re-query routing function was designed to support customers with many routing options to complete a call. In a call scenario where the routing tree contains a DCDS and the DCDS number references a routing tree with a destination with more than three routes, the call has the option of re-querying. If the call does re-query, the SCP receives a query message that looks the same as the initial query, meaning the Called Party Number value is the value of the original query message. The SCP processes the re-query as an initial query. Specifically, the SCP encounters the same DCDS encountered on the initial query and attempts to collect the same digits from the caller. FIG. 9 illustrates a message sequence chart for a call re-query to the SCP and FIG. 10 illustrates a flow diagram for a re-query to the SCP.

Error Conditions of the DCDS Process:

In some digit collection scenarios a caller may enter incorrect digits. For these cases the DCDS call processing of the SCP supports the retry function. The SCP engages the retry function a maximum of two (2) times for a given call. The retry function is engaged when the SCP is unable to process the digits returned by the switch as a result of a conversation TCAP invoke instruction from the SCP. The conversation TCAP invoke instructions are based on DCDS information.

Figure 11:
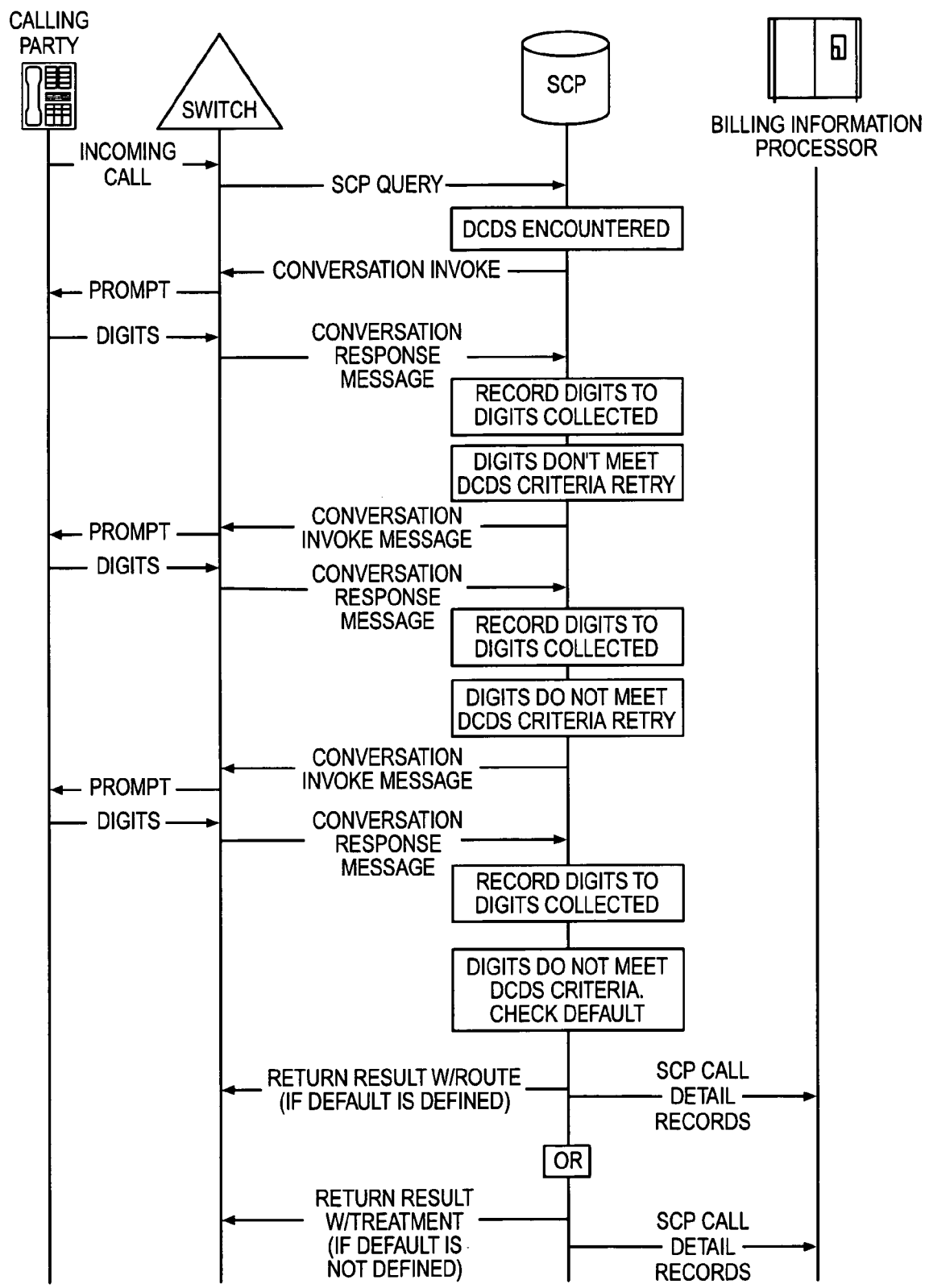
FIG. 11 illustrates a message sequence diagram for a call with two (2) retry attempts in an example of the present invention.

The SCP supports two retry efforts for a given call attempt. Meaning, a caller has a total of three attempts to correctly enter the digits associated to the DCDS. If the SCP processes the last attempt and it fails, SCP call processing references the Default condition. If the default condition is set SCP processing uses the default information to complete the call. If the default condition is not set SCP processing uses the treatment conditions of the DCDS or the SCP treatment table to complete the call. FIG. 11 illustrates a call flow with 2 retry attempts from a caller entering the wrong digits.

Inter-Digit Time-Out:

In other digit collection scenarios the caller may exceed the allowed inter-digit time. The inter-digit time is the time allowed for each digit to be dialed. If a calling party exceeds the inter-digit time following the first digit, the switch sends all previous digits collected. For example, if the calling party entered the first and second digit within the allowed inter-digit time but failed to enter the third digit within the required time, the switch would send the first two digits to the SCP in a conversation response. The SCP would determine that the digits are invalid and process through the retry condition as stated above.

Caller Enters No Digits:

If the calling party enters no digits when they are prompted the switch will time-out using the inter-digit timer of the originating trunk group. The switch sends a Time-out clear cause value in the conversation w/Permission, Resource Clear message. The SCP uses the Time-out clear cause value of two and checks the retry logic of the DCDS. If the Retry capability is enabled the SCP processes through the retry logic. If the retry logic is not enabled the SCP uses the default or treatment logic of the DCDS.

Calling Party Abandon:

If the calling party abandons the call during conversation messaging between the SCP and switch the switch sends a User Abandon to the SCP in a conversation w/Permission, Resource Clear message. The User Abandon is identified in the Clear Cause Parameter. The SCP uses the message to clear the call from SCP processing, including the removal of the call from context. The SCP does not send a response to the Return Error message.

Treatment Code for DCDS:

A new SCP Treatment code is added to the existing list of SCP treatment codes for the DCDS processes. When a caller is unable to meet the conditions of the DCDS during the initial digit collection attempt and the retry digit collection attempts, and the Digit Collection Treatment Code is not defined, SCP processing assigns the call an SCP treatment code. If the DCDS does not allow any retry attempts (i.e. Retry Option=N) and the Digit Collection Treatment Code is not defined, SCP processing assigns the call an SCP treatment code.

SCP Call Detail Records:

The prior art SCP capability was limited to only collecting Account Code digits. The account code digits collected were recorded to a dedicated SCP call detail records field called Account codes. With the introduction of the DCDS the SCP call detail records process for capturing Account Code digits is modified so the account code digits are recorded to a new SCP call detail records field established for digits collected through the DCDS. A new SCP call detail records field is added called the "Digits Collected". In addition, the Data Structures Traversed values recorded to the SCP call detail records are modified to include a value for the DCDS.

Instead of designating a separate SCP call detail records field for each digit type, i.e. a field for account codes, a field for PIN, a field for zip, etc., one field is used to capture all digit types. The SCP call detail records' "Digits Collected" field identifies the digit type of the digits recorded to the field. If multiple digit types are collected in a single call session the SCP call detail record repeats the field for each unique digit type. The SCP can repeat the digits collected field a maximum of three times.

The digits recorded to the field are the digits collected through the Expanded Account Code process or through the DCDS. The digits returned to the switch in the conversation TCAP response are recorded to the field. In the case of a retry, the digits collected through the retry effort overwrite the digits collected through the initial effort. The digits collected field always contains the last digits collected.

Figure 12:
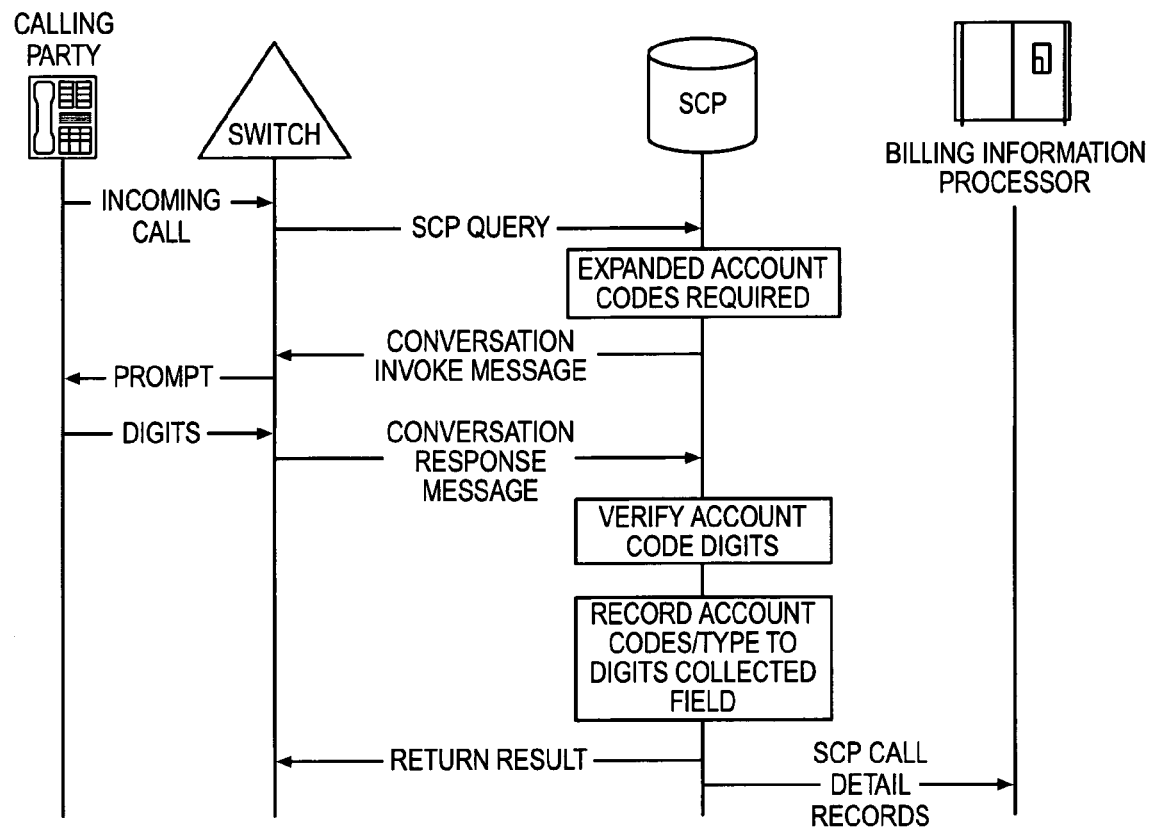
FIG. 12 illustrates a message sequence diagram for expanded account code digits recorded to the digits collected field in an example of the present invention.

The SCP call detail record layout is modified to accommodate the new digits collected field. The new field is assigned a new data identifier. The field is populated with the digits type and the digits collected through the instructions of the DCDS or the account code digits collected through the digit collection process. Since the account codes are now recorded to the digits collected field the existing SCP call detail records field "account code" is removed. The Data Identifier for the account code field becomes a spare data identifier value. FIG. 12 illustrates expanded Account Code digits recorded to the digits collected field.

The SCP assigns a version number of "03" for all SCP call detail records produced. The version number is passed as part of the Block Header information sent from the SCP to the billing information processor. The version number is used by the billing information processor to determine the control functions for merging the newly formatted SCP call detail records.

Figure 13:
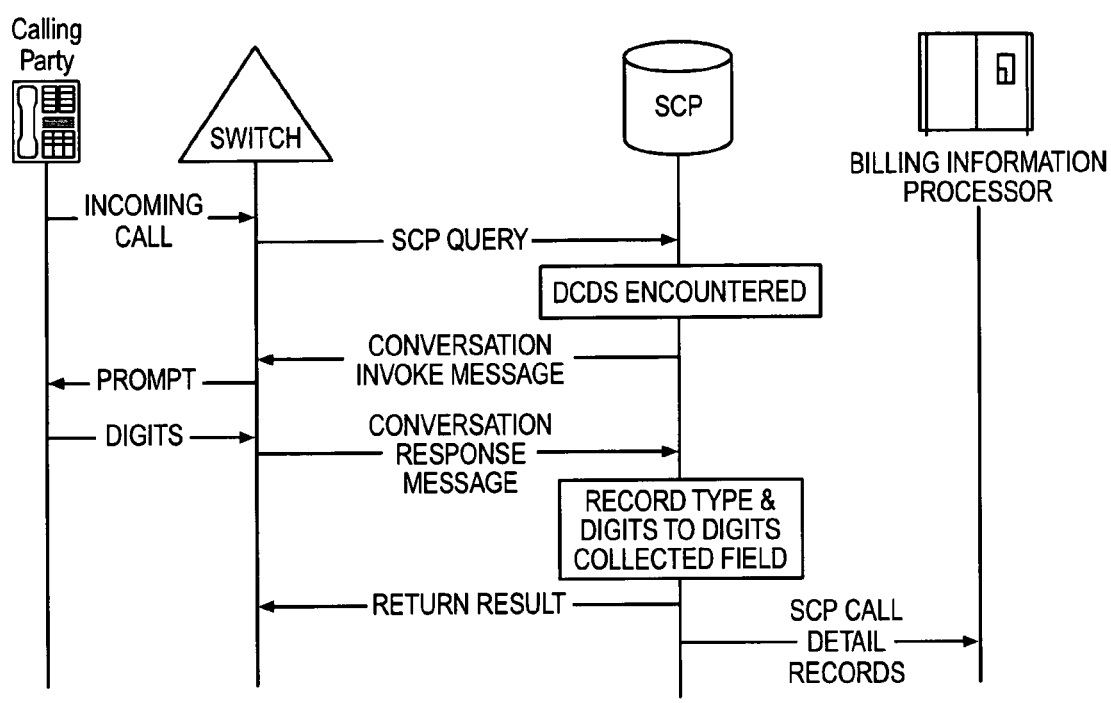
FIG. 13 illustrates message sequence diagrams for the SCP call detail records process in an example of the present invention.
Figure 14:
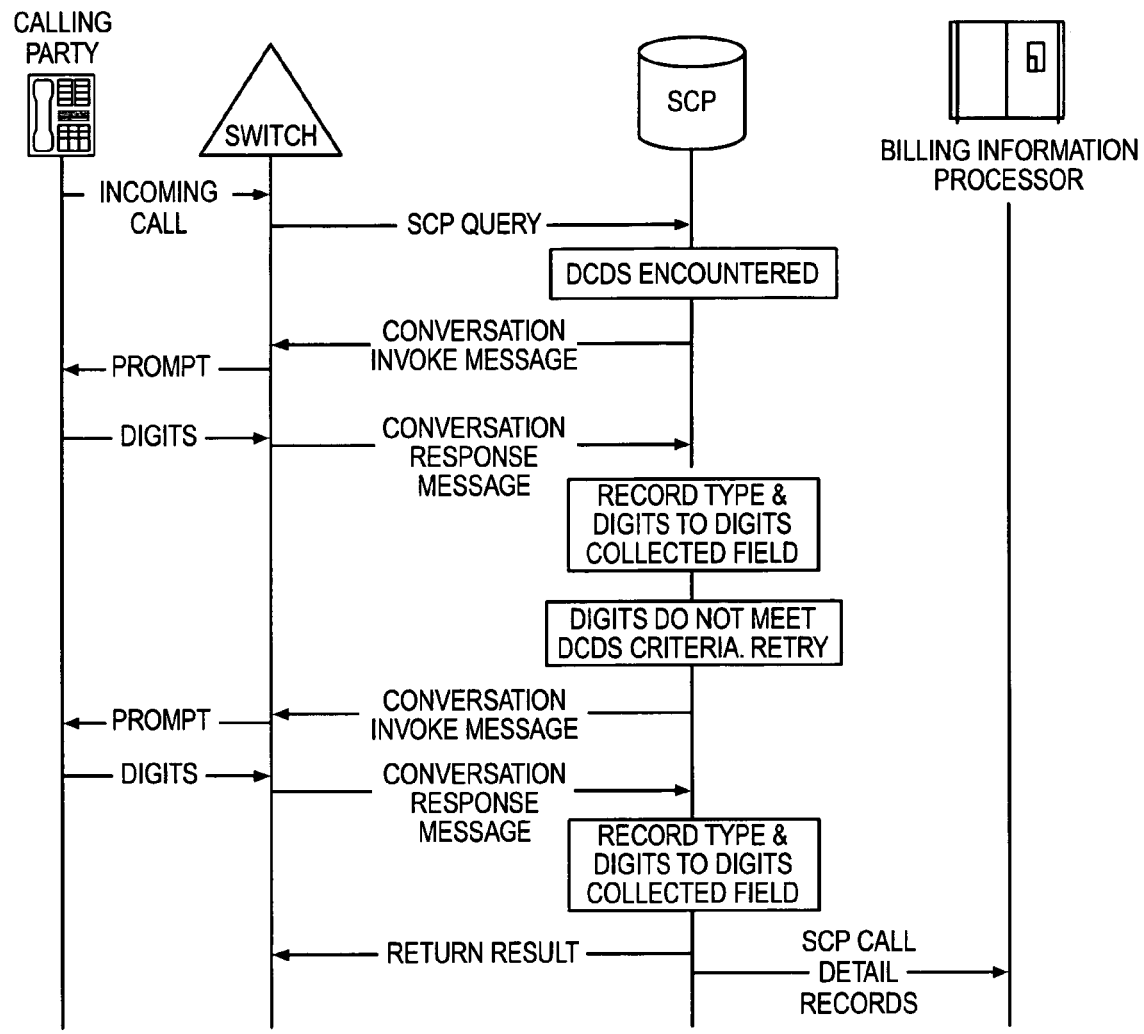
FIG. 14 illustrates message sequence diagrams for the SCP call detail records process in an example of the present invention.

The SCP call detail records are modified to capture the account code information collected and the DCDS information collected to a new field called Digits Collected. The digits collected field captures the digit type collected and the digits collected. In a call scenario where digits collected are through a retry attempt, the digits collected field contains the last set of digits collected by the SCP. For a single SCP call detail recording multiple digit types, the digits collected field is repeated. FIGS. 13 and 14 illustrate message sequence diagrams for SCP call detail records with initial digits collected and with digits collected from a retry.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

I claim:

1. A Service Control Point (SCP), comprising:
a processing system in the SCP configured to process a query from a communication device responsive to a call attempt from a caller to generate an instruction to collect caller information from the caller, and process the caller information collected from the caller to generate call routing information for completing the call attempt to a destination; and
an interface in the SCP configured to receive the query from the communication device, transmit the instruction to the communication device, receive the caller information from the communication device, and transmit the call routing information to the communication device.

2. The SCP of claim 1, wherein the processing system is configured to validate the caller information collected from the caller.

3. The SCP of claim 2, wherein the caller information comprises digits collected from the caller.

4. The SCP of claim 3, wherein the processing system is configured to validate the digits based on a type of the digits.

5. The SCP of claim 3, wherein the processing system is configured to validate the digits based on a length of the digits.

6. The SCP of claim 3, wherein the processing system is configured to validate the digits by comparing the digits to individual digit streams defined in the SCP.

7. The SCP of claim 3, wherein the processing system is configured to validate the digits based on an inter-digit time.

8. The SCP of claim 2, wherein the interface system is configured to re-transmit the instruction to the communication device if the processing system determines that the caller information collected from the caller is invalid.

9. The SCP of claim 1, wherein the instruction includes a prompt to play to the caller.

10. The SCP of claim 9, wherein the instruction includes a time-out interval for the communication device if the caller fails to enter the caller information responsive to the prompt.

11. The SCP of claim 1, wherein the processing system is configured to record the caller information in a call detail record.

12. A method of operating a Service Control Point (SCP), the method comprising the steps of:
receiving a query from a communication device into the SCP responsive to a call attempt from a caller;
in the SCP, processing the query to generate an instruction to collect caller information from the caller;

transmitting the instruction from the SCP to collect the caller information to the communication device;

receiving the caller information from the communication device into the SCP,;

in the SCP, processing the caller information to generate call routing information for completing the call attempt to a destination; and transmitting the call routing information from the SCP to the communication device.

13. The method of claim 12, further comprising the step of validating the caller information collected from the caller.

14. The method of claim 13, wherein the caller information comprises digits collected from the caller.

15. The method of claim 14, wherein the step of validating the digits collected from the caller comprises:

validating the digits based on a type of the digits.

16. The method of claim 14, wherein the step of validating the digits collected from the caller comprises:

validating the digits based on a length of the digits.

17. The method of claim 14, wherein the step of validating the digits collected from the caller comprises:

validating the digits by comparing the digits to individual digit streams defined in the SCP.

18. The method of claim 14, wherein the step of validating the digits collected from the caller comprises:

validating the digits based on an inter-digit time.

19. The method of claim 12, further comprising:

re-transmitting the instruction to the communication device if the caller information is invalid.

20. The method of claim 12, wherein the instruction includes a prompt to play to the caller.

21. The method of claim 20, wherein the instruction includes a time-out interval for the communication device if the caller fails to enter the caller information responsive to the prompt.

22. The method of claim 12, further comprising the step of:

recording the caller information in a call detail record.

23. A communication system, comprising:

a communication device configured to receive a call attempt from a caller and transmit a query; and a Service Control Point (SCP) configured to receive the query, process the query to generate an instruction to collect caller information from the caller, and transmit the instruction to the communication device;

the communication device configured to receive the instruction, collect the caller information from the caller responsive to the instruction, and transmit the caller information to the SCP;

the SCP configured to process the caller information to generate call routing information for completing the call attempt to a destination, and transmit the call routing information to the communication device;

the communication device configured to complete the call attempt to the destination responsive to the call routing information.

24. The communication system of claim 23, wherein the SCP is configured to validate the caller information collected from the caller.

25. The communication system of claim 23, wherein the communication device comprises a switch.

26. The communication system of claim 23, wherein caller information comprises digits.

* * * * *